R. P. SCOTT.
GREEN PEA VINE HULLING MACHINE.
APPLICATION FILED SEPT. 29, 1913.
1,263,130.
Patented Apr. 16, 1918.
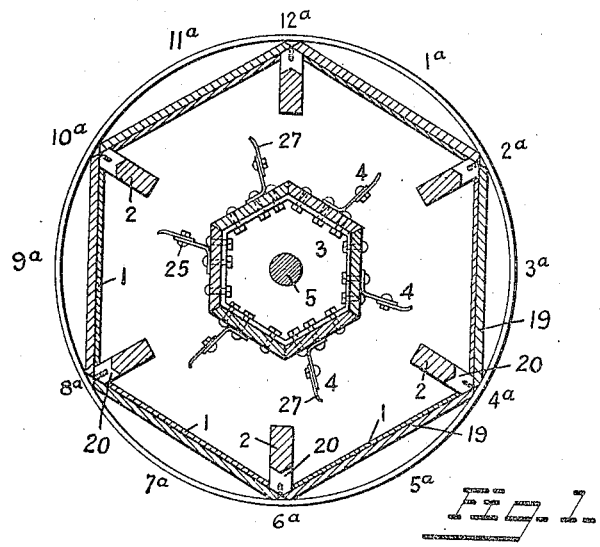
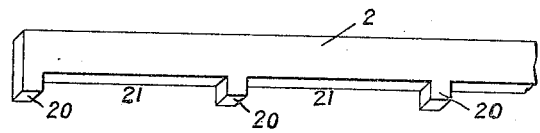
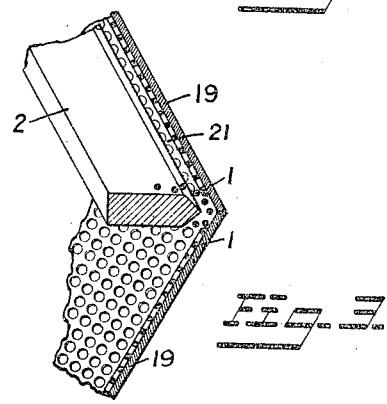
Witnesses:
Eric B. Kramer
L. F. Little
Inventor
Robert P. Scott
By his Attorney

UNITED STATES PATENT OFFICE.

ROBERT P. SCOTT, OF CADIZ, OHIO.

GREEN-PEA-VINE-HULLING MACHINE.

1,263,130.

Specification of Letters Patent. Patented Apr. 16, 1918.

Original application filed April 7, 1913, Serial No. 759,387. Divided and this application filed September 29, 1913. Serial No. 792,439.

*To all whom it may concern:*

Be it known that I, ROBERT P. SCOTT, a citizen of the United States, residing at Cadiz, Harrison county, Ohio, have invented certain new and useful Improvements in Green-Pea-Vine-Hulling Machines, of which the following is a specification, this application being a division of my copending case, Serial No. 759,387, filed April 7, 1913.

My invention relates to green pea vine hulling machines and to an improvement upon such machines as shown in Letters Patent Nos. 499,397, June 13, 1893 to R. P. Scott, 957,442 May 10, 1910 to R. P. Scott; 957,443, May 10, 1910 to R. P. Scott; 957,444 May 10, 1910 to T. A. Scott; 500,299, June 27, 1893 to Scott and Chisholm. These machines comprise an outer screen drum provided with inward-projecting lifting ribs, and an inner part with beaters, which latter when rotating are spaced inward from the innermost portions of the lifting ribs, so that the pods are not torn apart by a threshing action, but burst open by impact.

The object of my invention is to improve upon all former machines in a respect that will increase the efficiency of the machine and its capacity to hull and separate peas.

The invention consists in the construction of the outer cylinder, especially in relation to the elevating ribs and screening surfaces.

In the drawings,

Figure 1 shows a transverse section of the outer elevating cylinder and ribs connecting the two end rings.

Fig. 2 shows a detailed perspective view of one elevating rib.

Fig. 3 shows a perspective of the elevating rib and two adjacent sifting surfaces.

Pea vine hulling machines are in almost universal use for hulling green peas from the vines and as is well known consist of a frame provided with travelers supporting an outer revoluble cylinder or drum with annular ends. The ends of the drum are connected by elevating ribs. An inner drum or prism integral with a central shaft carries the beaters. The feed ends of both drums and the lifting ribs and beaters are shown in Fig. 1.

The six sides of the outer drum are covered by screens which may be of sheet metal or wire, perforated rubber, however, having been most used in the past.

Perforated rubber 1 Fig. 1 is held in the frames secured to the elevating ribs 2.

The inner beater carrying drum 3 carries beaters 4 rotated by shaft 5, arranged in sets along the shaft. The beaters 4 have outer portions 27 secured to the inner portions by bolts 25. The rotation of the outer revoluble drum and the inner beater carrying drum will be assumed to be clock wise as indicated by the numerals $1^a$ to $12^a$.

When the vines with peas attached as they come mowed in bulk from the field are fed into the machine, they are caught by one of the lifting ribs 2 and carried around and up to about the 11 o'clock position indicated by the numeral $11^a$ when they are dropped off into the path of the more rapidly revolving beaters 4.

The beaters striking the vines throw them across to about the 2 o'clock position indicated by the numeral $2^a$. The foregoing operation has been common in pea vine hulling machines, but it will be seen that when the vines are struck and any of the peas liberated there has been but one chance of discharging the hulled peas on the two o'clock side of the machine. That is, first, if the peas strike a perforation fairly and are thrown through the outer screening surface. Otherwise they would strike the rubber covering between the holes and drop down upon the mass of vines and be imprisoned between the vines and the upper surface of the lifting rib. That peas are thus retained inside is indicated by the fact that most all of the hulled peas are found directly under the seven o'clock position showing that the principal sifting is done as the peas and vines roll over themselves at that point.

In accordance with this invention the hulled peas are given a better chance to get to the outside at once, as they are struck and thrown across the top. That is to say if the peas once get away from the vines I now give them less chance to get mixed up again. The rib does not run out against the frame 19 of the rubber covering as heretofore but only at places or intervals 20 to support the frame 19. I make a space between the lifting rib and the perforated screen, the rib being spaced or cut away at 21 so that if any hulled peas are loose from the vine they will pass between the rib and the screening surface down onto the clear sifting surface of the screen below whereas otherwise hulled peas would be held imprisoned at the outer edge of the lifting rib and the screening surface if no space were provided between the rib and the screen.

The spaces are of slot-like character, extending lengthwise of the ribs at their outer edges, between the same and the wall of the drum. The slotted openings at the outer edges of the ribs also obviate the accumulation of dirt and debris which may occur adjacent to the screen fabric when solid ribs are employed.

Claims:

1. In a green pea vine hulling machine a drum, a screening surface forming the wall of the drum and a solid lifting rib constructed and arranged to leave a space for the peas to pass between the screening surface and the rib and a rotating beater carrying member within said drum.

2. In a pea vine hulling machine, the combination of a shaft, a drum, a plurality of perforated outer screens covering said drum, a plurality of solid lifting ribs, said ribs being so arranged with relation to said screens as to provide a passage between the ribs and the screens and a rotating beater carrying member within said drum.

3. A green pea vine hulling machine comprising an inner beater carrying prism and the outer drum provided with longitudinal lifting ribs and a perforated cover, said lifting ribs being substantially imperforate, except at points adjacent to the cover where they are open substantially as described.

4. A green pea vine hulling machine, comprising an outer member consisting of a screen drum with lifting ribs, and an inner drum with beaters which rotate in a space inward of the innermost portions of the lifting ribs, the said outer member being provided with longitudinal openings extending lengthwise of the drum and located at the outer edges of the lifting ribs.

5. In a green pea vine hulling machine, a rotary screen drum having lifting ribs spaced from the drum by longitudinal openings at the outer edges of the ribs and a rotating beater carrying member within said drum.

6. In a green pea vine hulling machine, the combination with an inner beater-bearing part and an outer screen-carrying drum, of lifting ribs on said screen drum formed with longitudinal slots in their outer edge portions adjacent to the screen carried by the drum.

In testimony whereof, I have signed my name to this specification, in the presence of two subscribing witnesses.

ROBERT P. SCOTT.

Witnesses:
LOUELLA F. LITTLE,
FLORENCE WEISE.